March 16, 1943.   J. J. BLOOMFIELD   2,314,030
LOCK-UP FOR TORQUE ENGAGED CLUTCHES
Filed May 12, 1941   3 Sheets-Sheet 1
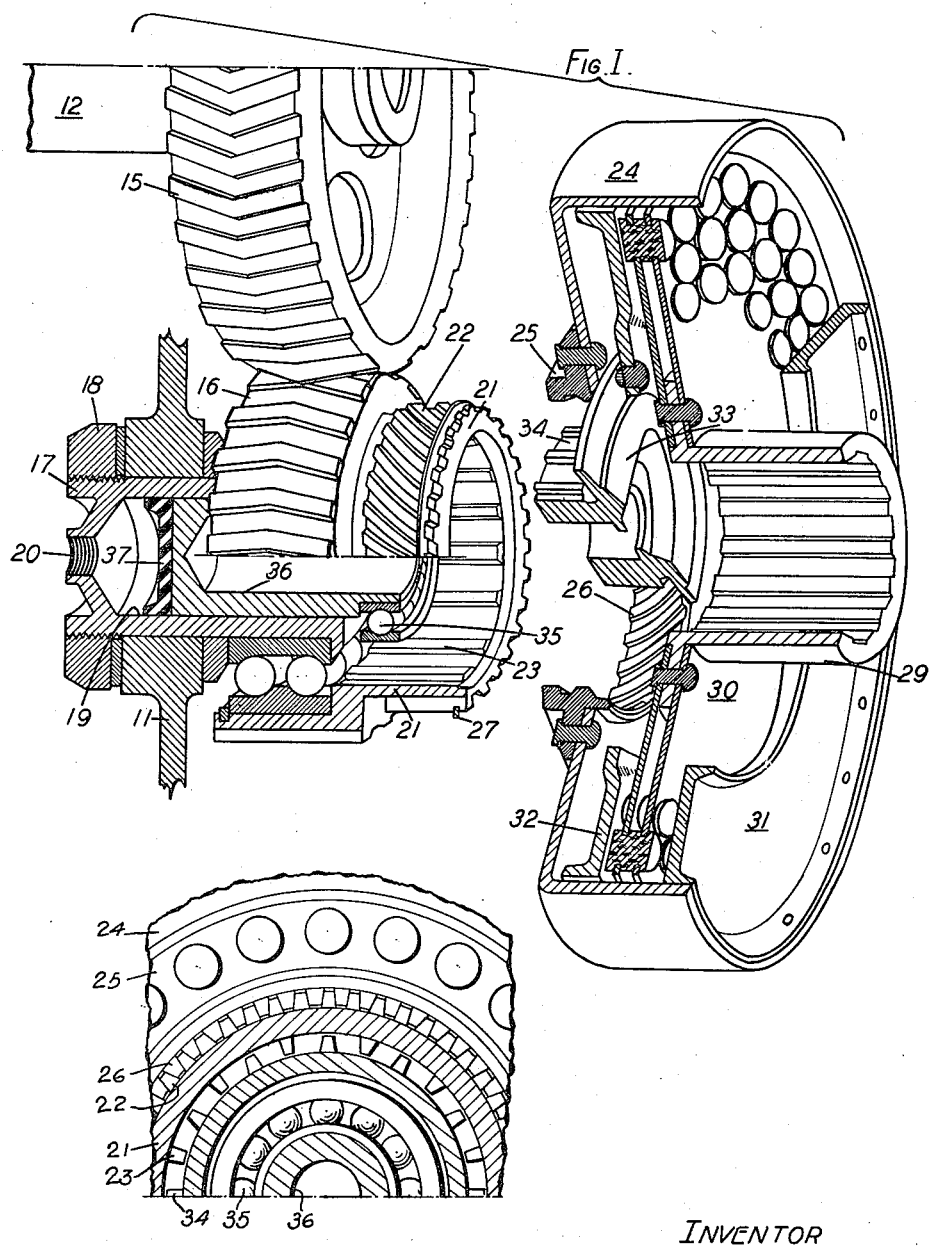
Fig. I.
Fig. VII.
INVENTOR
John J. Bloomfield.

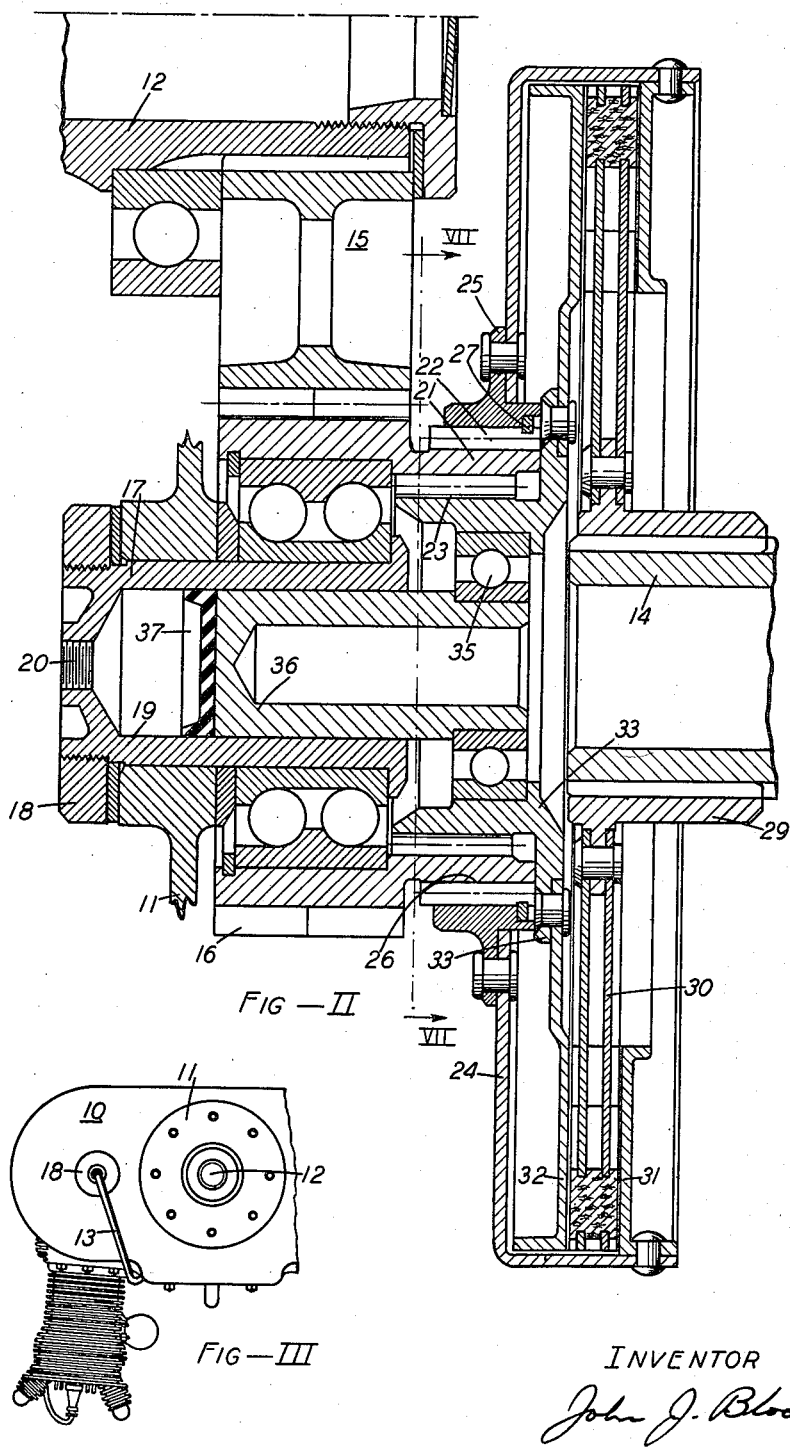

March 16, 1943. J. J. BLOOMFIELD 2,314,030
LOCK-UP FOR TORQUE ENGAGED CLUTCHES
Filed May 12, 1941 3 Sheets-Sheet 3
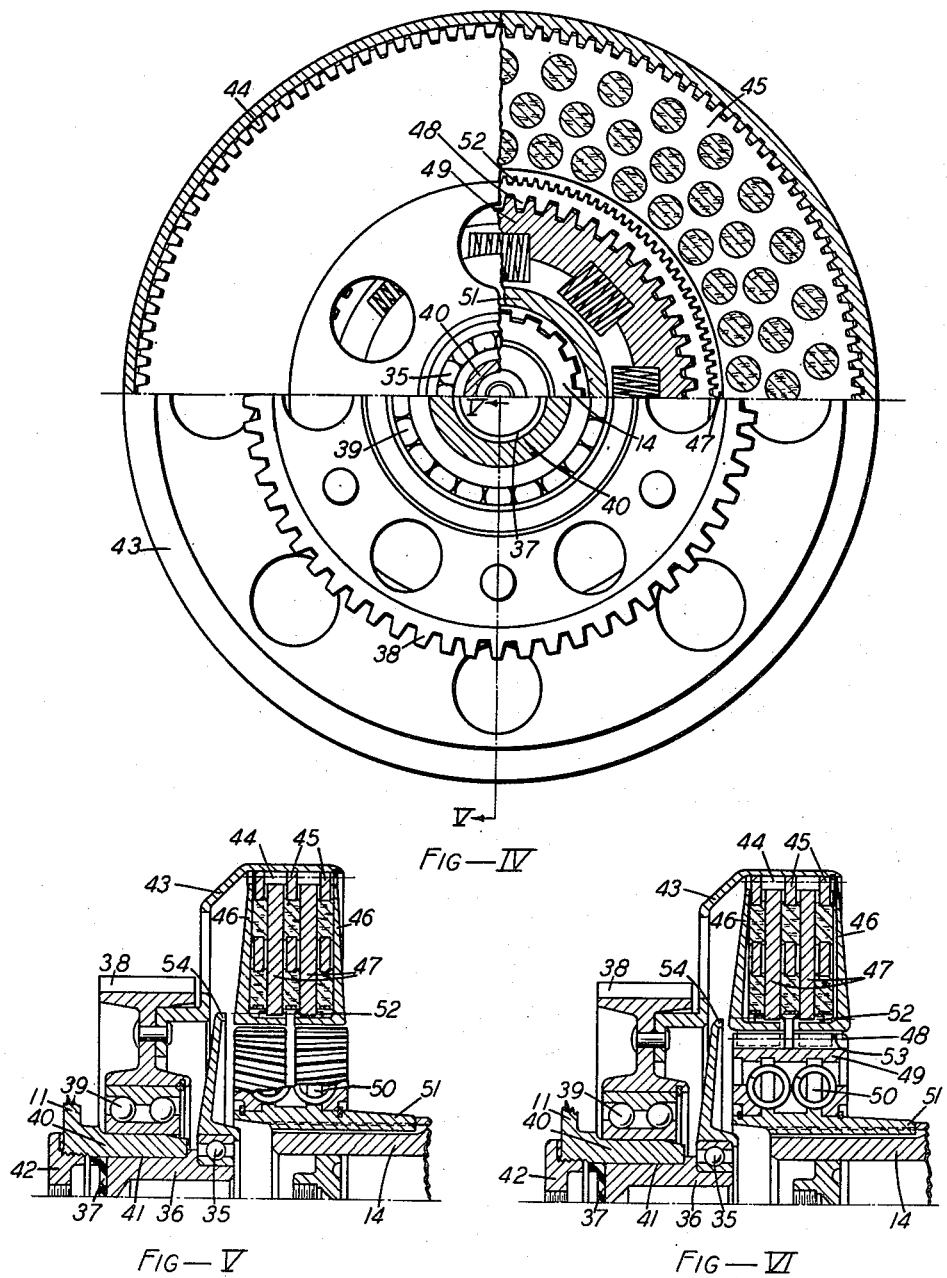
Fig—IV
Fig—V
Fig—VI
INVENTOR
John J. Bloomfield Patented Mar. 16, 1943

2,314,030

UNITED STATES PATENT OFFICE 2,314,030

LOCKUP FOR TORQUE ENGAGED CLUTCHES

John J. Bloomfield, Burbank, Calif., assignor, by mesne assignments, to Vega Aircraft Corporation, a corporation of California Application May 12, 1941, Serial No. 393,109

5 Claims. (Cl. 192—41)

This invention relates to one-way drive or torque engaged clutches having auxiliary clutch engaging means operable when it is desired to transmit reverse torque through the clutch. The invention is particularly applicable when it is desired to couple two or more engines to a single drive, such as an airplane propeller. With such an arrangement one or more engines may transmit power to the propeller while the other engine or engines are shut down; and the auxiliary clutch engaging means can be utilized to start any other engine after one engine of the group has been started in the normal way.

It has heretofore been proposed to utilize two engines driving a single propeller through a roller clutch, as in the Menasco Patent No. 2,180,599 for example; but such an arrangement lacks the lock-up for reverse torque, and to add another clutch for this purpose rather complicates the structure. Also, in the use of such roller clutches, uneven idling, as when starting from cold, may cause one engine to drop out of the drive if the other momentarily overspeeds, thus requiring restarting of the stalled engine.

It is accordingly an object of this invention to provide an improved torque engaged friction clutch adapted to normally transmit engine torque through a suitable transmission without permitting reverse flow of torque to motor the engine, unless auxiliary clutch engaging means is deliberately energized to accomplish this purpose.

It is another object of this invention to provide a torque energized friction clutch that can be frictionally engaged to transmit reverse torque at the will of the operator, such engaging means comprising a hydraulically energized pressure plate to overcome the disengaging tendency of reverse torque on the normal clutch engaging mechanism.

It is a further object of this invention to provide a torque energized friction clutch wherein two movable pressure plates engage the driven disc, together with spiral or herringbone gears adapted to cause said pressure plates to engage the disc when torque is applied in one direction, hydraulic means being provided to apply pressure to one of said plates to overcome the disengaging tendencies of the spiral or herringbone gears under conditions of reverse torque.

It is also an object of this invention to provide an improved and simplified driving arrangement whereby a plurality of engines can be connected to a common final drive such as an airplane propeller, the arrangement being such that one or more engines can drop out of the drive, and a single engine can be started and thereafter be utilized at will to start the remaining engines through the common drive.

Other and further important objects of this invention will be apparent from the disclosures in the specification and the accompanying drawings.

This invention is shown in two forms in the accompanying drawings wherein—

Figure I is a partially disassembled and broken away perspective view of one form of the clutch of this invention, being separated at the torque responsive gearing.

Figure II is a longitudinal central section through the clutch shown in Figure I.

Figure III is a fragmentary front view of a twin engine airplane power plant driving a single propeller, one engine being omitted.

Figure IV is a front view of a modified form of clutch, broken away in two stages to show the interior construction thereof, the final drive having been omitted.

Figure V is a central fragmentary section on the line V—V of Figure IV showing the clutch engaged.

Figure VI is a section similar to Figure V showing the clutch disengaged due to torque reversal.

Figure VII is a fragmentary transverse section on the line VII—VII of Figure II showing provision for angular motion between the clutch and the driven pinion.

As shown in the drawings—

In both forms of the invention, referring to Figure III, two or more engines 10 have a common gear case 11 from which a central airplane propeller shaft 12 projects. Hydraulic fluid pressure lines 13 have suitable valves under the control of the operator and lead into the gear case in axial alignment with the crankshaft 14 of each engine for purposes to be later described. As shown in Figure I, the propeller shaft 12 carries a gear 15 within the case, with which driving pinions 16 for each engine engage. In the case of two engines driving a single propeller, the two drive pinions 16 preferably engage the gear 15 on opposite sides thereof to reduce unbalanced loads thereon.

Referring to the form of the invention shown in Figures I and II, the pinion 16 has a ball bearing mounting on a sleeve 17 clamped in the gear case 11 by a collar 18, the sleeve also providing a hydraulic cylinder 19, the closed end of which is connected to the oil line 13 at 20.

The gear 16 carries an annular extension 21 having spiral teeth 22 on the outside and spur teeth 23 internally, every other tooth being omitted in the latter. A clutch case 24 is attached to a hub 25 having internal spiral teeth 26 meshing with the teeth 22 on the pinion extension 21, being retained in place by a split ring 27 in a groove in the teeth 22. The arrangement is such that angular movement due to torque between the gears 22 and 26 results in longitudinal movement of the case 24 relative to the pinion 16, which movement is utilized to energize or disengage the clutch according to whether the engine is delivering power or dragging on the propeller.

The engine crankshaft 14 has the hub 29 of a clutch disc 30 splined thereto, the particular disc shown being of the cork insert variety since the clutch as a whole rotates in an oil bath in the gear case. One pressure plate 31 for the clutch disc is attached to the clutch case 24 for movement therewith. The other pressure plate 32 is mounted on a hub 33 having spaced spur teeth 34 to mesh with the teeth 23 in the pinion extension 21, the hub bearing against the extension 21 when the clutch is engaged by torque, so that under such circumstances the pressure plate 32 can be called the fixed plate, while the pressure plate 31 attached to the case 24 is then the movable plate, clamping the clutch disc 30 against the pressure plate 31, which in turn is backed up by the extension 21 of the pinion 16.

Since engagement and disengagement of the clutch necessitates angular movement between the frictional elements, because of the spiral teeth or splines 22 and 26, the lost motion between teeth 23 and 34 allows sufficient angular movement to disengage the clutch, upon reversal of torque, without initial angular movement between the loaded clutch plates.

The hub 25 of the clutch case 24 is supported on a ball bearing 35 carried by a piston 36 which is movable in the hydraulic cylinder 19 formed in the sleeve 17. Cup-like packing 37, on the head of the piston forms an adequate seal and enables fluid pressure, entering through the pipe 13, to force the piston 36 to the right, carrying the pressure plate 32 and its hub 33 to the right in the clutch case 24, thus engaging the clutch disc 30 against the pressure plate 31 carried by the case 24. Under these conditions the case 24 is held against movement to the right because its hub 25 bears against the split ring 27. This arrangement permits the propeller shaft, when being driven by another engine, to pick up and start a dead engine. When the latter begins to deliver power, its torque, acting through the spiral gears 22 and 26, draws the clutch case to the left, causing the pressure plate 31 to restore the hydraulic piston and its engaging train to the position shown in the drawings, wherein the pressure plate 32 is backed up by the extension 21 on the pinion 16, providing full clutch engaging pressure when the hub 25 moves to the left from the position shown in Fig. II. The hydraulic clutch engaging mechanism thus serves to cushion the engagement of the torque engaged clutch, and can be used to supplement the latter at the will of the operator.

In the arrangement shown the source of hydraulic pressure may be the usual high pressure hydraulic system used to operate various plane accessories such as flaps and retractable landing gear, or a manual system resembling the usual automobile hydraulic brake operating mechanism.

In the second form of the invention, shown in Figures IV, V and VI, a pinion 38, corresponding to the pinion 16, meshes with the propeller gear 15 and is journaled in a ball bearing 39 mounted on an inwardly projecting boss 40 forming part of the gear case 11. The boss 40 forms a hydraulic cylinder 41, in which the piston 36 moves as before, and is externally closed by a plug 42 to which the oil line 13 is connected. The pinion 38 has a clutch case 43 secured thereto, which case has internal gear teeth 44 with which driven clutch discs 45 engage. As shown, three driven discs are interposed between two driving pressure plates 46 and two intermediate driving plates 47, the pressure plates being mounted on herringbone gear teeth 48 on a hub 49 having a torsion spring connection 50 to a hub 51 splined on the engine crankshaft 14. The intermediate driving plates 47 in turn are mounted on gear teeth 52 on the hubs of the pressure plates 46, to drive as a unit therewith. With this arrangement the engine torque acting through the hub 49 and herringbone gear teeth 48 draws the two pressure plates inwardly or towards each other to engage the clutch, the spiral angle of the teeth being chosen to develop the desired engaging pressure in the clutch. Conversely if the speed or torque of one engine falls for any reason, so that the propeller tends to overrun that engine, the reversal of torque will urge the pressure plates 46 outwardly on the teeth 48, disengaging the clutch. Outward movement of the right hand pressure plate 46 is limited by a split ring 53, which also serves to back up this plate when the left hand plate is forced theretowards by energization of the hydraulic control.

The hydraulic control previously described acts through the piston 36 on a follower 54 carried by the bearing 35, the follower contacting the left hand pressure plate 46 to engage the clutch for the transmission of torque from the propeller to the engine.

The two forms of this invention chosen for illustrative purposes are alike in principle of operation in that two opposing pressure plates are movable towards and away from each other in response to the thrust developed in spiral or herringbone gears which act as spiral splines, one pressure plate being also capable of being actuated by hydraulic pressure to maintain the clutch in engagement under conditions of reverse torque that would otherwise act through the spiral splines to disengage the clutch.

In both forms of the invention, as long as each engine, of a group driving a common propeller, is generating more power than required to maintain a speed proportional to that of the propeller, it will act to engage the torque clutch through relative movement of the spiral or herringbone gears. If the throttle of one engine is closed, while the other engines are still delivering power to the propeller, the latter will tend to try to pull the idle engine, reversing the direction of flow of torque by overrunning, thus unscrewing the torque clutch and releasing the engine so that it can either run idle independently of the other engines and propeller, or stop if the ignition switch is cut or the engine is developing trouble. Thus a damaged engine can automatically drop out of the drive before it is further damaged by forced rotation from the propeller.

After one engine has been started in the usual manner, the propeller drive can be utilized to start the other engines of the group by means of the hydraulic lock up of the torque clutches.

It will thus be seen that I have invented an improved torque energized clutch that is self energizing for the transmission of torque in one direction, and will permit the driven element to overrun the driving element upon reversal of the flow of torque, together with an improved form of hydraulically energized frictional lock up capable of picking up and transmitting the full torque of the engine in either direction.

Having thus described my invention and the present preferred embodiments thereof, I desire to emphasize the fact that many modifications may be resorted to in a manner limited only by a just interpretation of the following claims.

I claim:

1. In a torque engaged clutch for the one way transmission of power, a drum, a pair of oppositely acting pressure plates within said drum and in driving relationship therewith, torque engaging means comprising spiral gear teeth adapted to coact with said pressure plates to draw at least one of said plates towards the other upon application of torque in one direction, and to force them apart upon reversal of the direction of torque, and hydraulically energized means adapted to engage one of said pressure plates and overcome the tendency towards separation thereof upon application of reverse torque whereby to engage said pressure plates for transmission of torque in both directions.

2. In a torque engaged clutch for the one-way transmission of power, a drum adapted to serve as the driven element of the clutch, a pair of opposing pressure plates in said drum, each movable relative to the other for engaging and disengaging said clutch, spiral gear means operatively engaging at least one of said pressure plates and adapted to shift said plates towards and away from each other according to the direction of flow of torque, and a hydraulic motor adapted to engage one of said pressure plates whereby to engage said pressure plates regardless of the direction of torque whereby to override the disengaging tendency of reverse torque upon the spiral gear means.

3. In a torque engaged clutch for the one-way transmission of power, a clutch disc, a movable pressure plate adapted to engage one face of said disc, a second movable pressure plate adapted to engage the opposite face of said disc, a drum embracing said pressure plates and driven therefrom, torque responsive means adapted to advance one of said pressure plates into driven engagement with said clutch disc, means forming an abutment for the other of said pressure plates, manually controllable means adapted to advance the abutment, whereby to bring the other of said pressure plates into driving engagement with said clutch disc, whereby to convert the torque engaged one-way clutch into a drive for the reverse transmission of torque, said manually controllable means being so constructed and arranged as to provide a limited rotational freedom to facilitate torque disengagement of said clutch.

4. In a torque engaged clutch for the one-way transmission of power, a driving disc, a drum embracing the same, a pressure plate carried by the drum in engaging relationship with said driving disc, a second pressure plate disposed within said drum on the opposite side of said driving disc and movable theretowards, a hub for said second pressure plate, mounting means for said hub including spiral gear teeth engaging said drum and interrupted splines engaging said pressure plate hub and permitting limited rotation thereof, said mounting means being so constructed and arranged as to simultaneously provide for a rotational and shifting movement of the drum and a corresponding rotational movement of the pressure plate hub whereby to facilitate torque disengagement of the clutch without relative motion between the driving disc and pressure plates.

5. In a torque engaged clutch for the one-way transmission of power, a driving disc, a drum embracing the same, a pressure plate carried by the drum in engaging relationship with said driving disc, a second pressure plate disposed within said drum on the opposite side of said driving disc and movable theretowards, a hub for said second pressure plate, mounting means for said hub including spiral gear teeth engaging said drum and interrupted splines engaging said pressure plate hub and permitting limited rotation thereof, said mounting means being so constructed and arranged as to simultaneously provide for a rotational and shifting movement of the drum and a corresponding rotational movement of the pressure plate hub whereby to facilitate torque disengagement of the clutch without relative motion between the driving disc and pressure plates; and hydraulic means so constructed and arranged as to shift said pressure plate hub relative to the drum whereby to clamp said driving disc into driving engagement with the pressure plate carried by said drum.

JOHN J. BLOOMFIELD.